United States Patent
Chandrasekhar et al.

(10) Patent No.: US 10,375,582 B2
(45) Date of Patent: Aug. 6, 2019

(54) UPLINK CHANNEL ACCESS, RESERVATION AND DATA TRANSMISSION FOR LICENSED ASSIST ACCESS LONG TERM EVOLUTION (LAA-LTE)

(71) Applicant: Cisco Technology, Inc., San Jose, CA (US)

(72) Inventors: Vikram Chandrasekhar, Mountain View, CA (US); Kedar Shirali, Sunnyvale, CA (US); Qing Zhao, Fremont, CA (US); Rajesh Pazhyannur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/991,155

(22) Filed: May 29, 2018

(65) Prior Publication Data

US 2018/0288625 A1 Oct. 4, 2018

Related U.S. Application Data

(62) Division of application No. 15/227,099, filed on Aug. 3, 2016, now Pat. No. 10,028,151.

(60) Provisional application No. 62/202,281, filed on Aug. 7, 2015.

(51) Int. Cl.
*H04W 72/00* (2009.01)
*H04W 16/14* (2009.01)
*H04W 74/08* (2009.01)
*H04L 1/18* (2006.01)

(52) U.S. Cl.
CPC .......... *H04W 16/14* (2013.01); *H04L 1/1896* (2013.01); *H04W 74/0816* (2013.01); *H04L 1/1812* (2013.01)

(58) Field of Classification Search
CPC .............. H04W 16/14; H04W 74/0816; H04L 1/1896; H04L 1/1812
USPC ....................................................... 455/454
See application file for complete search history.

(56) References Cited

U.S. PATENT DOCUMENTS

| | | | | |
|---|---|---|---|---|
| 8,867,521 B2 * | 10/2014 | Hakola | ................ | H04B 1/713 370/310 |
| 10,028,151 B2 * | 7/2018 | Chandrasekhar | ........................... | H04W 74/0816 |
| 2005/0286477 A1 * | 12/2005 | Gupta | ............... | H04W 74/0875 370/338 |
| 2012/0147822 A1 * | 6/2012 | Deb | ................. | H04W 74/0833 370/329 |
| 2014/0362780 A1 | 12/2014 | Malladi et al. | | |

(Continued)

*Primary Examiner* — Amancio Gonzalez
(74) *Attorney, Agent, or Firm* — Edell, Shapiro & Finnan, LLC

(57) ABSTRACT

A mobile device transmits data over a shared spectrum in an uplink channel to a base station in a contention-based access scheme. The mobile device obtains data to be wirelessly transmitted over the shared spectrum in the uplink channel to the base station. The uplink channel is formatted with a frame/subframe structure with a predetermined timing. The mobile device determines whether the shared spectrum is free for transmission according to a listen before transmit procedure. When the shared spectrum is free for transmission, the mobile device contends with other mobile device to gain access to the uplink channel. After gaining access to the uplink channel, the mobile device transmits the data over the shared spectrum in the uplink channel to the base station.

20 Claims, 9 Drawing Sheets

(56) References Cited

U.S. PATENT DOCUMENTS

2015/0049712 A1 2/2015 Chen et al.
2016/0338096 A1 11/2016 Vajapeyam et al.

\* cited by examiner

UPLINK CHANNEL ACCESS, RESERVATION AND DATA TRANSMISSION FOR LICENSED ASSIST ACCESS LONG TERM EVOLUTION (LAA-LTE)

CROSS REFERENCE TO RELATED APPLICATION

This application is a divisional of U.S. application Ser. No. 15/227,099, filed Aug. 3, 2016, which claims priority to the U.S. provisional patent application No. 62/202,281, filed Aug. 7, 2015, the entirety of which are hereby incorporated by reference.

TECHNICAL FIELD

The present disclosure relates to wireless communication networks.

BACKGROUND

The Long Term Evolution (LTE) wireless communication technology includes an advancement known as LTE-U (LTE-Unlicensed), also referred to as LAA-LTE (Licensed Assisted Access-LTE), that utilizes unlicensed spectrum, typically in the 5 GHz band to provide additional radio spectrum.

Channel access mechanisms over the uplink channel are needed when LTE is deployed with Listen-Before-Talk (LBT) over unlicensed spectrum (e.g., via LAA). Due to LBT employed at both an Evolved Node B (eNB or eNodeB) and User Equipment (UE), existing LTE uplink scheduling with synchronous Hybrid Automatic Repeat Request (HARD) schemes does not work.

DESCRIPTION OF EXAMPLE EMBODIMENTS

Overview

Figure 1:
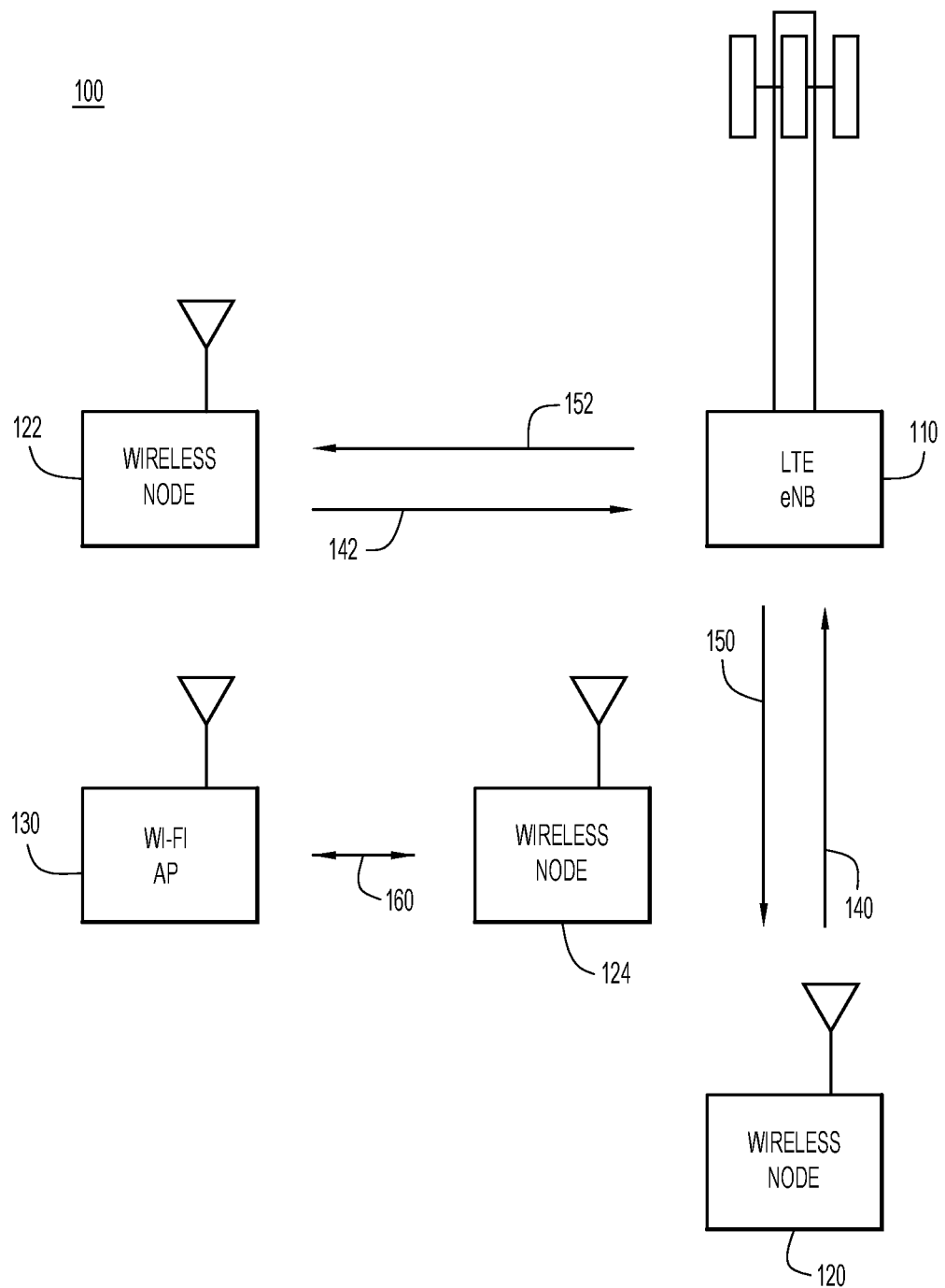
FIG. 1 is a simplified block diagram of an LAA-LTE uplink system, according to an example embodiment.

A method is provided for a mobile device to transmit data over a shared spectrum in an uplink channel to a base station. The mobile device obtains data to be wirelessly transmitted over a shared spectrum in an uplink channel to a base station. The uplink channel comprises a plurality of frames and subframes with a predetermined timing. The method involves determining whether the shared spectrum is free for transmission according to a Listen Before Transmit procedure. Responsive to a determination that the shared spectrum is free for transmission, the mobile device selects a start time in the uplink channel that mitigates interference from other mobile devices in proximity to the mobile device. Beginning at the start time, the mobile device transmits the data over the shared spectrum in the uplink channel to the base station.

DETAILED DESCRIPTION

Presented herein are techniques for uplink channel access, medium reservation and uplink transmission for LTE operation in the unlicensed spectrum. These schemes ensure that LTE-LAA UEs contend for medium access in a fair manner with respect to other devices (e.g. Wi-Fi®) in unlicensed frequencies. Unlike existing solutions that typically try to reuse the scheduled uplink access principles of an LTE uplink (which can be sub-optimal when LBT is considered), these schemes may use randomized, contention-based uplink channel access.

LTE devices can experience (and create) dynamic and unpredictable interference when receiving (and transmitting) in unlicensed spectrum. Examples of such interface are: cross-radio access technology (RAT) interference from unmanaged devices (Wi-Fi, Bluetooth, etc.), interference between UE devices belonging to different operators but served by an eNodeB with identical Physical Layer Cell ID (PCI collision), potential de-sense when a UE carries multiple RAT devices (e.g. receiving a Wi-Fi signal can be impaired if the same device transmits on LTE on the same channel).

Presented herein are modifications to uplink channel access for Licensed Assisted Access LTE (LAA-LTE) operation in unlicensed spectrum. Due to Listen-Before-Talk mechanism employed at both eNodeB (eNB) and UE, the following may no longer apply:

1. A fixed latency (=4 ms in LTE-Frequency Division Duplex (FDD)) between the time of reception of scheduling grant and time of sending of uplink data (via PUSCH).
2. Synchronous Uplink HARQ operation.
3. PUSCH transmission starts at subframe boundary.

Thus, presented herein are techniques for uplink channel access, medium reservation and uplink transmission for LAA-LTE operation in the unlicensed spectrum.

To mitigate interference from/to LTE devices, 3GPP has agreed to the following.

License-Assisted Access (LAA) to ensure that the LTE operation over unlicensed frequency channel is tethered via a licensed primary carrier;

LAA-LTE shall abide by region specific regulation (Europe, Japan) concerning transmission over unlicensed frequencies;

Listen-before-talk (LBT) to ensure that LTE devices monitor the background energy on the medium before transmitting any signal; and Limit maximum transmit burst duration to prevent persistent background LTE interference.

Referring now to FIG. 1, a simplified block diagram of LAA-LTE system 100 is shown. LAA-LTE system includes LTE eNB 110 and mobile wireless nodes 120 and 122 that communicate over a shared spectrum of wireless frequencies. A Wi-Fi access point 130 also uses the shared spectrum to communicate with mobile wireless node 124. In one example, one or more of the wireless nodes 120, 122, and/or 124 may be capable of communicating using both LAA-LTE transmissions and Wi-Fi transmissions. Wireless nodes 120 and 122 receive wireless transmissions from the LTE eNB 110 in downlink channels 140 and 142, respectively. Wireless nodes 120 and 122 send wireless transmissions to the LTE eNB 110 in uplink channels 150 and 152, respectively. Wi-Fi access point 130 and wireless node 124 communicate back and forth through a channel 160 on the shared spectrum, which may interfere with LAA-LTE transmissions to/from the LTE eNB 110.

In one example, a typical LTE uplink 150 obeys the following principles:

Given a scheduling grant at time slot "n", the Physical Uplink Shared Control Channel (PUSCH) is transmitted at (n+k) where k=4 (for Frequency Division Duplex (FDD)) and k depends on the subframe configuration for Time Division Duplex (TDD); and LTE uplink 150 may employ synchronous HARQ with an 8 HARQ process in FDD. By synchronous, it is meant that the HARQ process number is implicitly determined by the index of the subframe on which the scheduling grant takes place.

In another example, uplink channel access in LAA-LTE may not reuse the channel access mechanism over licensed carrier because LBT is required at both eNB 110 (prior to sending a Downlink Control Information (DCI), i.e., a scheduling grant) and wireless node 120 (prior to PUSCH transmission). Thus, the latency between the time of the scheduling grant and the time of channel access may be unpredictable if the wireless node 120 is unable to transmit due to the medium being busy. Additionally, due to the LBT process prior to transmission over the unlicensed channel, synchronous uplink HARQ operation may not work. For example, in FIG. 1, if wireless node 120 detects a transmission from wireless node 124 (i.e., a client of Wi-Fi access point 130) to access point 130, its LBT mechanism would prevent the wireless node 120 from transmitting in response to the UL scheduling grant.

Presented herein are uplink enhancements for LAA-LTE in terms of channel access, data scheduling and data transmission for unlicensed operation.

Listen Before Talk (LBT)

In one example, a wireless node 120 monitors the energy of the shared spectrum/medium and declares the medium is BUSY if the energy exceeds a threshold, Edmresh. This consists of an Initial Clear Channel Assessment (ICCA) followed by (optional) Extended CCA (ECCA).

The LBT mechanism presented in this example proceeds in two stages:

ICCA: Continuously listen to the medium for a time duration $D_{icca}$. If the medium is free, the wireless node 120 is free to transmit as long as the subframe is a valid uplink subframe (in case of TDD). Otherwise, the wireless node 120 follows an Extended CCA procedure.

ECCA: For each ECCA slot (slot duration=$D_{ecca}$) in which the medium is idle, the counter (initially set to a suitably chosen number N) is decremented by one. N is chosen to be either a fixed value or adjusted dynamically (e.g. truncated exponential back-off). If the wireless node 120 detects that the medium is busy with N>0 or if the transmission is only for downlink transmissions, the wireless node 120 freezes the counter N. The wireless node 120 resumes counting down the backoff counter N once the medium is free and once the subframe is a valid uplink subframe. Once N=0, the wireless node 120 stops the counter and declares and end of the LBT process. The wireless node 120 is now free to transmit data (via PUSCH), and optionally a reservation signal, as described hereinafter.

Reservation Signal

When the wireless node 120 has performed contention back-off and is ready to transmit PUSCH, it is desirable that the wireless node 120 informs its neighbor devices (via a signal) that it is going to radiate energy on the medium. The neighbors (e.g., wireless nodes 122, 124, and/or Wi-Fi access point 130), upon hearing the signal, will refrain from transmitting on the medium.

A reservation signal (RS) is transmitted by the wireless node 120 to inform neighbor LTE devices (e.g., wireless node 122) and non-LTE devices (e.g., Wi-Fi access point 130) of an impending transmission. The RS is transmitted on the uplink after an LBT process is performed at the wireless node 120. The RS occupies K>=1 LTE OFDM symbols (K is a function of the time gap until nearest available PUSCH segment). In one example, the RS transmission is wide-band to obtain frequency diversity. Alternatively, the RS may be transmitted over the set of resource blocks (RBs) over which the wireless node 120 transmits its PUSCH.

The RS serves two purposes:

1. Alerts neighbor LAA-LTE devices (including the eNB 110 serving the wireless node 120) regarding an impending uplink transmission from the wireless node 120. The signal may also contains information such as the Cell Radio Network Temporary Identifier (C-RNTI) of the wireless node 120, the start time of PUSCH transmission and the Public Land Mobile Network Identity (PLMN-ID) which may be useful for inter-operator operation in same unlicensed frequency channel.

2. Alerts Wi-Fi devices (e.g., Wi-Fi access point 130 and wireless node 124) for which the uplink transmissions of the mobile device 120 are received above a predetermined threshold, Ed-Threshold.

In one example, the contents of the RS may include a substantially identical format and transmission structure as Wi-Fi Request-to-Send (RTS) with dedicated media access control (MAC) addresses for wireless node 120 (i.e., as a sender) and LTE eNB 110 (i.e., as a receiver). This informs neighbor Wi-Fi devices (e.g., Wi-Fi access point 130 and wireless node 124) of an impending LTE transmission. The duration field may be populated by the time duration for which the PUSCH transmission occurs.

Alternatively, the contents of the RS may include a dedicated signal communicating one or more of the following information: Modulation Coding Scheme (MCS) of the uplink transmission, C-RNTI, PLMN-ID of the carrier network to which the wireless node 120 belongs, transmission duration and starting OFDM symbol (PUSCH segment) of the PUSCH transmission, HARQ process ID of the Uplink Shared Channel (UL-SCH), and/or redundancy version.

In one example, the C-RNTI may be sent explicitly. Alternatively, the C-RNTI may be included in the RS implicitly, e.g., by applying a scrambling sequence that is a function of the C-RNTI and the Physical Layer Cell ID of the LTE eNB 110.

Modifications to the LTE Uplink

The time of completion of LBT (i.e., initial defer time and contention-backoff time) may not align with the start of a valid subframe for an uplink transmission. The asynchronous nature of channel access for uplink transmission may cause the starting time of PUSCH to not align with an uplink subframe boundary. Additionally, due to LBT, the latency between the uplink grant reception time and the transmission of PUSCH may be unpredictable (e.g., due to congestion in medium). Further, multi-access operation over the LTE uplink channels may not be guaranteed since the transmission of the wireless node 120 over a subframe may prevent wireless node 122 from accessing the medium due to LBT requirements at the wireless node 122. Modifications for the LTE-LAA uplink are presented in terms of PUSCH transmission, HARQ operation and channel access.

Figure 2:
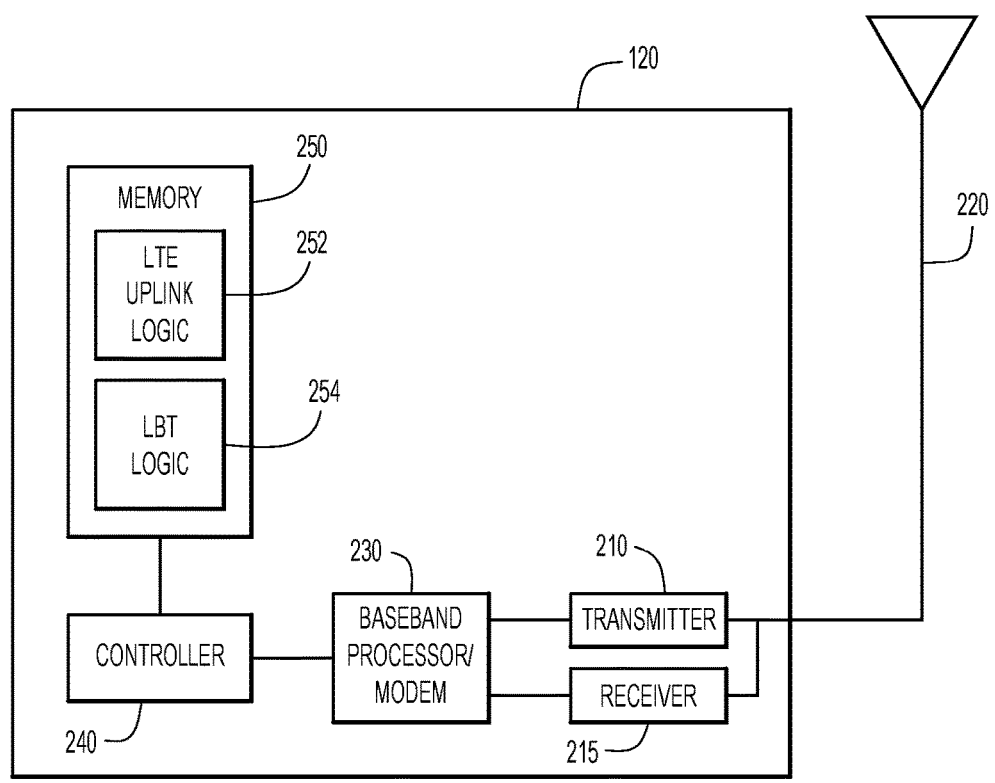
FIG. 2 is a simplified block diagram of a wireless device in the LAA-LTE uplink system, according to an example embodiment.

Referring now to FIG. 2, a simplified block diagram illustrates a wireless device, e.g., wireless node 120, configured to perform the LAA-LTE uplink methods as presented herein. The wireless node 120 is shown as an example of a wireless device, but other wireless devices (e.g., wireless nodes 122 and 124, LTE-eNB 110) may include similar components that perform similar methods. The wireless device 120 includes a transmitter 210 (or multiple transmitters), a receiver 215 (or multiple receivers), an antenna 220, a baseband processor 230 (e.g., a modem), and a controller 240 (e.g., a processor such as a microprocessor or microcontroller). The receiver 215 may comprise one or more receivers with the capability to detect signals according to a plurality of formats, e.g., Wi-Fi and LAA-LTE signals. The baseband processor 230 may perform media access control (MAC) functions as well as physical layer (PHY) functions. The methods presented herein may be implemented by control logic in the baseband processor 230. The control logic may take the form of fixed or programmable digital logic gates. In another form, the control logic may be implemented by instructions stored/encoded in memory 250 (e.g., LTE uplink logic 252, LBT logic 254) and executed by the controller 240. The memory 250 may also store data (e.g., user data, control data, etc.) related to the control logic.

The memory 250 may include read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein.

Figure 3:
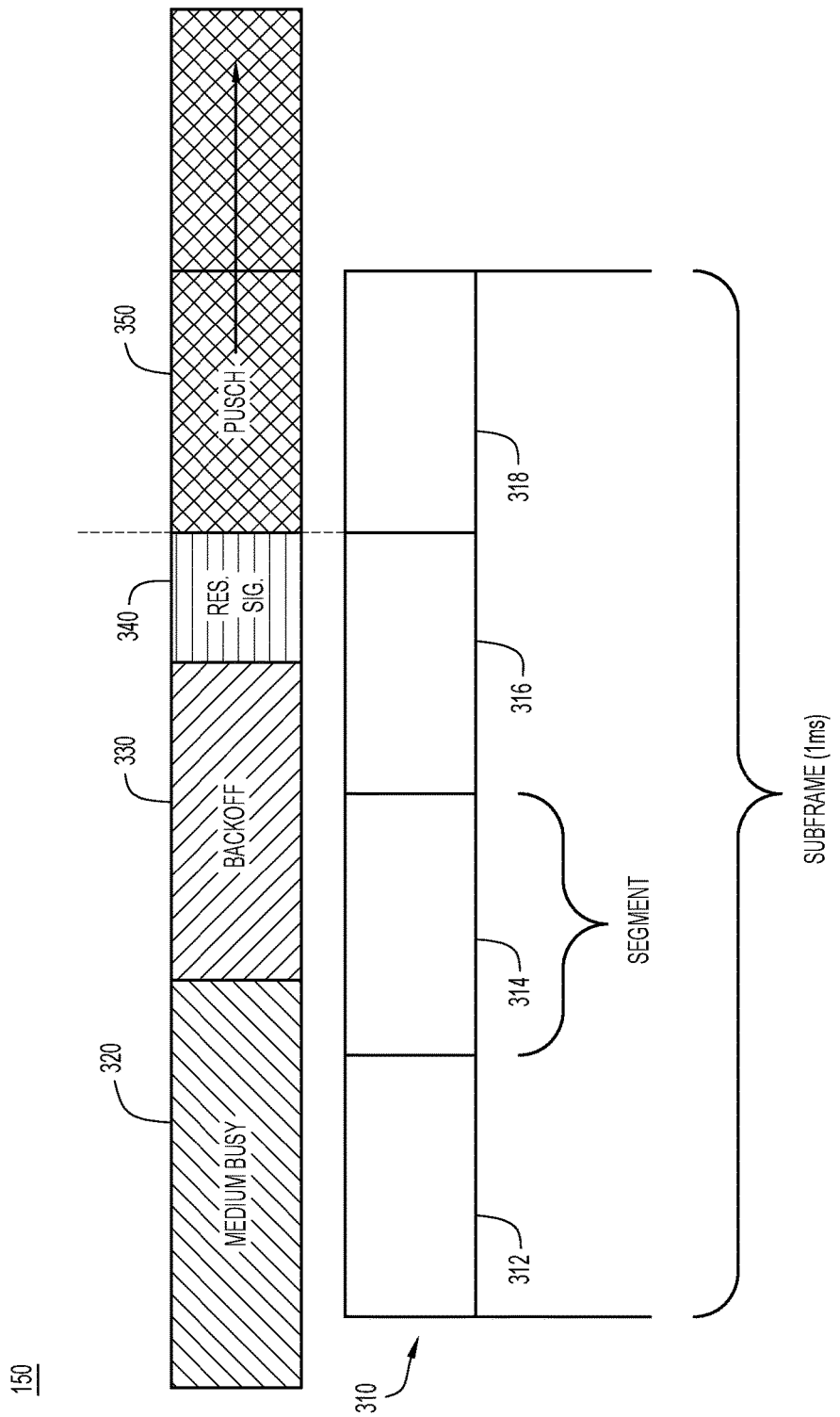
FIG. 3 is diagram illustrating signaling modifications of the Physical Uplink Shared Control Channel (PUSCH), according to an example embodiment.

Referring now to FIG. 3, an example of the signaling modification of the uplink transmission 150 is shown. Unlike licensed radio operation, the LBT mechanism at the wireless node 120 may potentially result in the wireless node 120 detecting that the medium is idle (hence free for transmission) in the middle of an uplink subframe. FIG. 3 presents a scheme wherein the LTE subframe 310 is divided into segments (or sub-subframes) 312, 314, 316, and 318 and describes how the wireless node 120 conveys the start time of its data transmission to the LTE eNB 110 via the RS.

The wireless node 120 detects that the medium is busy during time period 320 by a clear channel assessment (e.g., ICCA/ECCA process) as part of a LBT process, which is not necessarily synchronized to any boundary between subframes or segments within the subframe. After the time period 320, i.e., when the medium is determined to be free, the wireless node 120 may wait for a randomly determined backoff period 330 before transmitting the reservation signal 340. The reservation signal 340 reserves the medium starting at the next segment boundary between segment 316 and segment 318. The reservation signal 340 may also reserve the medium for additional uplink subframes, which may be contiguous or non-contiguous with the segment 318 and subframe 310. Starting with the reserved segment 318, the wireless node 120 begins transmitting user data on the PUSCH 350.

In one example, the UL subframe 310 is divided into K segments (e.g., K=4 as depicted in FIG. 3), with each segment corresponding to a candidate starting OFDM symbol for PUSCH transmission. The value of K, i.e., the number of segments, may be signaled by the LTE eNB 110. In this example, each segment 312, 314, 316, or 318 may be thought of as a sub-subframe of subframe 310.

In another example, the wireless node 120 transmits on the PUSCH 350 starting from the OFDM symbol of the nearest segment 318 after transmission of the reservation signal 340. The reservation signal 340 may be transmitted after the backoff period 330 and occupy as many OFDM symbols as required until the start of the next segment 318, when the transmission of the PUSCH 350 begins.

In a further example, the wireless node 120 may adjust its transport block size based on the time available for PUSCH transmission 350. For instance, the wireless node 120 may choose its transport block size equaling Q(1/K×TBSSize) where TBSSize equals the transport block size corresponding to the MCS and #RBs as derived from TS36.213 and Q(x) returns the transport block size in TS36.213 that is closest to x for that MCS.

Channel Access Schemes

Two classes of channel access schemes are provided: contention-based channel access and scheduled channel access. In a contention-based scheme, the wireless nodes 120 and 122 access the shared channel after LBT, however, they do not require a scheduling grant from the eNB 110. The resources on which the wireless node 120 or 122 transmits its data are semi-statically assigned from the eNB 110. Additionally, a probabilistic channel access scheme may be provided wherein wireless nodes 120 and 122 probabilistically transmit after they detect that the medium is not busy.

In a scheduled channel access scheme, the wireless node 120 is scheduled to transmit data on the uplink channel 150 by the eNB 110 via an uplink scheduling grant. However, the latency between the grant reception and PUSCH transmissions is unpredictable due to LBT at wireless node 120. Scheduled access is similar to LTE uplink access with some key differences. The PUSCH is transmitted only after LBT and (potential) reservation signal transmission. Uplink HARQ mechanism is asynchronous, and the PUSCH transmission does not have to be aligned with subframe boundary. The associated modifications required for scheduled channel access are presented in more detail hereinafter with respect to FIG. 6 and FIG. 9.

Contention-based access involves autonomous UE uplink channel access. The eNB 110 may configure the wireless node 120 such that whenever the wireless node 120 accesses the medium it transmits only over the configured time/frequency resources. The access may be probabilistic, i.e., the wireless node 120 may transmit on the shared medium with probability p after an LBT procedure declares medium is idle. Probabilistic access statistically mitigates random access interference. The initial value of p may be set based on the node density (i.e., number of UEs served by eNB 110). The parameter p may be updated in a decentralized manner at each UE based on measured parameters such as HARQ-ACK statistics or the number of UE with active UL traffic. The updates may be performed at regular intervals or on an as-needed basis. Examples of contention-based access schemes are presented in more detail hereinafter with respect to FIG. 5 and FIG. 8.

Motivation of Contention-Based Access

With decentralized (non-scheduled) access, a UE with fewer neighbors to contend with is more likely to begin its PUSCH transmission. The PUSCH transmissions can cause a neighbor UE to back-off and prevent it from accessing the medium. It is therefore desirable to somehow ensure that a UE experiencing greater uplink congestion can obtain a fair share of the medium.

One way to ensure fair sharing of medium access is to randomize the uplink channel access for a UE given that it has detected that the medium is not busy. Initial access probability can be configured (via Radio Resource Channel (RRC) signaling) at the UE. The eNB can set this value based on the number of UEs with active traffic. Setting the access probability p=1 will result in the UE transmitting immediately after LBT and post contention-backoff. In one example, the access probability p may be updated on a regular (semi-static) basis based on the HARQ-ACK statistics over a time-span of a few tens/hundreds of milliseconds.

Figure 4:
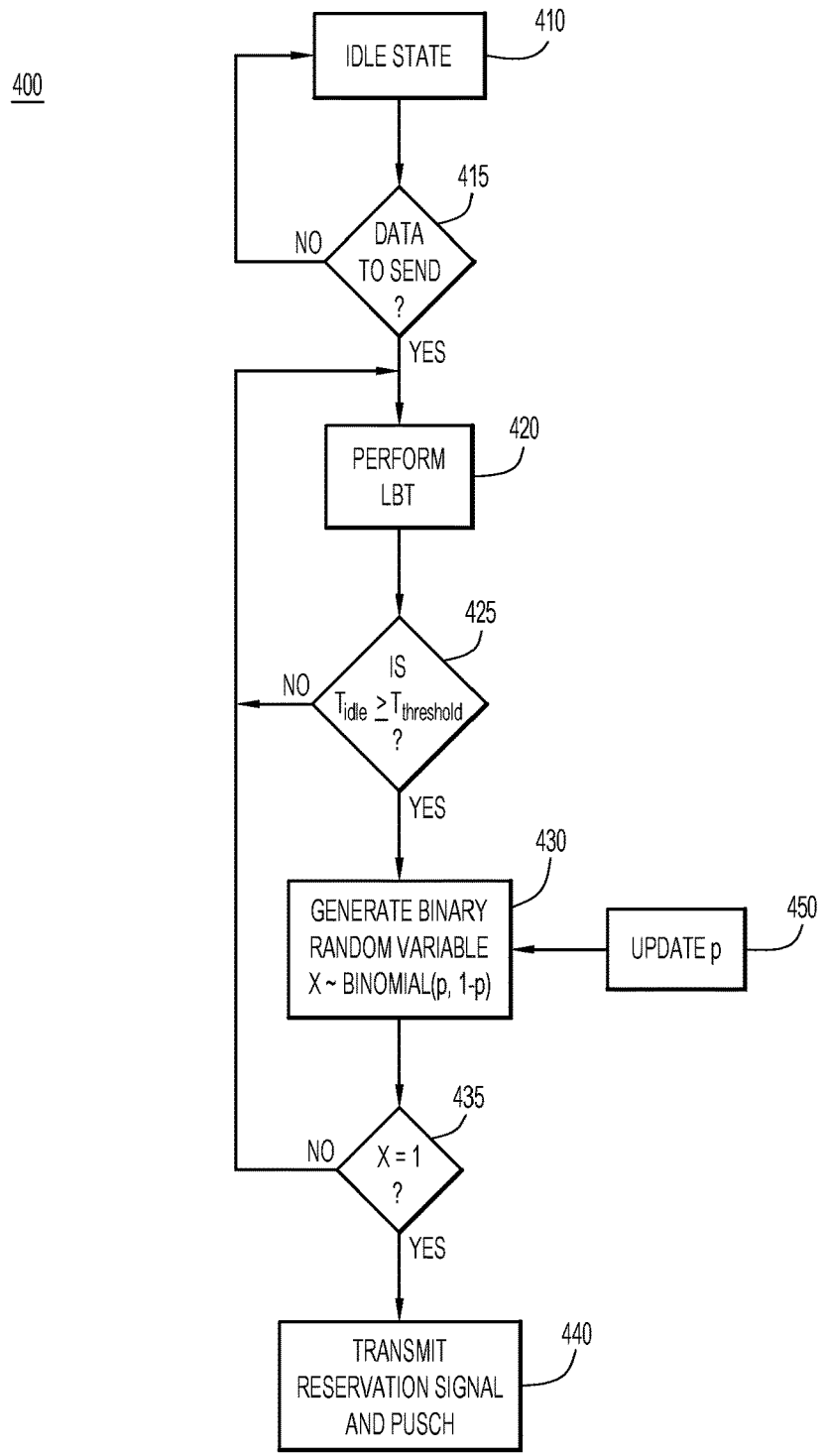
FIG. 4 is a flow chart illustrating the operations for contention-based uplink access, according to an example embodiment.
Figure 5:
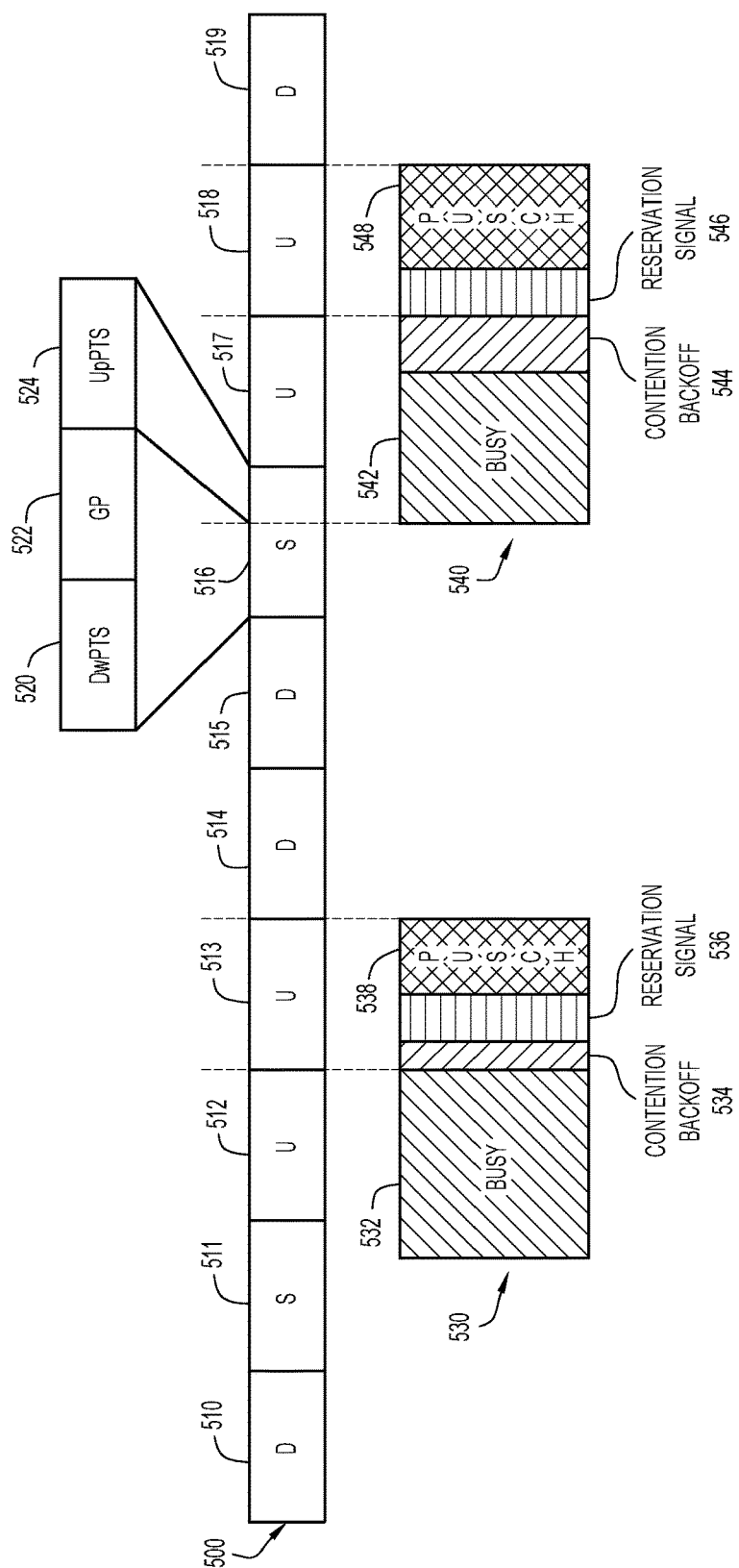
FIG. 5 is a timing diagram for contention-based access to the LAA-LTE uplink system, according to an example embodiment.

FIG. 4 is a flow chart illustrating the operations for contention-based uplink access. FIG. 5 is a timing diagram for contention-based access. The eNB configures each UE (with active traffic) with an uplink modulation coding scheme (MCS), a set of frequency resources (units: RB) and time resources (subframe offset within each radio frame and periodicity). The uplink MCS, frequency-time resources are signaled via UE-dedicated (Radio Resource Control) RRC signaling. The frequency resources may be logical and not physical, i.e., the resources sent by the eNB can be mapped to the actual physical resources to get additional frequency diversity. The UE continuously monitors the medium via CCA procedure. Upon completion of LBT and if the UE can access the channel, the UE does so on its configured time and frequency resources.

Referring now specifically to FIG. 4, a flowchart diagram illustrates operations in a channel access process 400 performed by a UE (e.g., wireless node 120) in a probabilistic contention-based uplink access scheme. The UE begins in an idle state 410 until it has data to send to its associated eNB, as determined in step 415. Once the UE determines that it has data to send, it performs a LBT process at step 420. The UE continues to perform the clear channel access of the LBT process until the time $T_{idle}$ for which the medium is determined to be idle exceeds a threshold time $T_{threshold}$, as determined in step 425. In one example, the idle time $T_{idle}$ is the time in which energy in the medium is below a first predetermined threshold $E_{dThresh}$ and in which no Wi-Fi preamble is decoded at an energy level above a second predetermined threshold $P_{dThresh}$. The threshold time $T_{threshold}$ may be calculated as $T_{threshold} = T_{ICCA} + T_{ECCA}*N_{slots}$, where $T_{ICCA}$ is the initial defer time of the ICCA process (e.g., on the order of a Distributed Coordination Function Interframe Space (DIFS) time period), $T_{ECCA}$ is the extended clear channel assessment defer time that models contention backoff, and $N_{slots}$ is the number of ECCA time slots for performing contention backoff. The number of backoff slots $N_{slots}$ may be randomly generated (e.g., via a linear or truncated backoff) or a fixed value.

Once the UE has determined that the medium has been idle for the threshold time, it generates a binary random variable X as a function of the channel access probability p in step 430. The binary random variable returns a value of X=1 with a probability of p, and returns a value of X=0 with a probability of 1−p. If X=1, as determined in step 435, then the UE will assert control of the shared medium and begin transmitting in step 440. In one example, the UE may transmit a reservation signal before transmitting PUSCH signals. The reservation signal alerts neighboring wireless devices of the impending PUSCH signals if the neighboring devices can decode the reservation signal above their energy detection threshold. The reservation signal may also include information for the eNB regarding the HARQ process ID and the redundancy version.

If the binary random variable X=0, then the UE returns to performing the LBT process, and defers access to the shared medium. In step 450 the UE may update the channel access probability p based on, e.g., HARQ-ACK statistics and/or the number of UEs with active traffic to send.

Referring now specifically to FIG. 5, a timing diagram illustrates transmissions from a UE (e.g., wireless node 120) to gain uplink access in a contention-based scheme. The timing of an LTE frame 500 is divided into subframes 510-519. In this example, subframes 510, 514, 515, and 519 are downlink subframes dedicated to transmissions from the eNB to the UE. Subframes 512, 513, 517, and 518 are uplink subframes dedicated to transmissions from the UE to the eNB. Subframes 511 and 516 are special subframes dedicated to maintaining the timing of the frame when switching from downlink to uplink transmissions. The special subframes are further divided into Downlink Pilot Time Slot (DwPTS) 520, Guard Period (GP) 522, and Uplink Pilot Time Slot (UpPTS) 524. While the example of FIG. 5 shows four uplink subframes, four downlink subframes, and two special subframes as an example of a frame, other configurations and numbers of uplink/downlink/special subframes may also use the techniques presented herein.

The transmission sequence 530 from a UE with data to send includes a clear channel assessment period 532 during which the UE determines whether the medium is busy or idle. After the medium is determined to be idle, the UE waits for a contention backoff period 534 before transmitting a reservation signal 536. The reservation signal 536 informs other wireless devices that the UE will be transmitting a PUSCH transmission 538 after the reservation signal 536.

A second transmission sequence 540 from either the same or a different UE with data to send includes a clear channel assessment period 542 during which the UE determines whether the medium is busy or idle. The clear channel assessment period 542 begins after the guard period 522 in the special subframe 516 and includes the UpPTS 524. After the medium is determined to be idle, the UE waits for a contention backoff period 544 before transmitting a reservation signal 546. The reservation signal 546 informs other wireless devices that the UE will be transmitting a PUSCH transmission 548 after the reservation signal 546.

Figure 6:
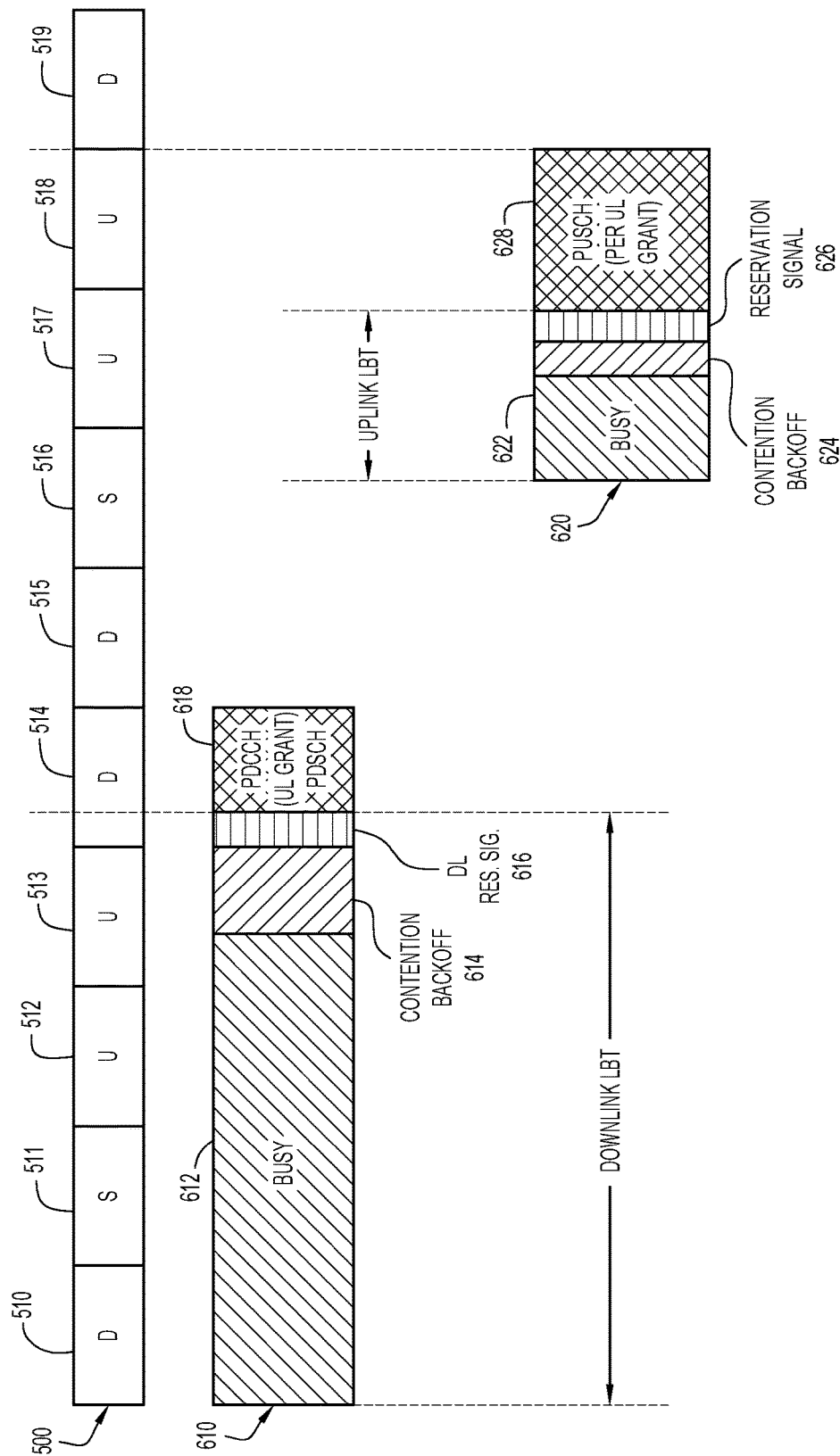
FIG. 6 is illustrates a timing diagram for scheduled access, according to an example embodiment.

Referring now to FIG. 6, a timing diagram illustrates transmissions for scheduled access to the shared medium for an uplink channel with reference to the frame structure 500. Initially, the eNB (e.g., eNB 110) begins a transmission sequence 610 with a downlink LBT process. The downlink LBT process includes a clear channel assessment period 612, a contention backoff period 614 and optionally a downlink reservation signal 616. After the downlink LBT process is complete, the eNB transmits the uplink grant in the Physical Downlink Control Channel (PDCCH) transmission 618 along with any Physical Downlink Shared Channel (PDSCH) during the downlink subframe 514. The uplink grant in the transmission 618 specifies that the UE is scheduled to transmit its data during uplink subframes 517 and 518.

In response to the uplink grant received in transmission 618, the UE begins the uplink transmission sequence 620 in the special subframe 516 preceding the scheduled uplink subframe. The uplink transmission sequence 620 begins with an uplink LBT process including a clear channel assessment period 622, a contention backoff period 624, and optionally a reservation signal 626. After the LBT process the UE transmits its user data in PUSCH transmission 628 as scheduled by the eNB in the uplink grant.

A scheduled access scheme requires the UE to be assigned a dynamic grant prior to sending PUSCH transmissions. Sending the dynamic grant via an unlicensed cell requires LBT to be performed at the eNB. Dynamic grant is signaled via a Licensed Pcell for cross-carrier scheduling. The latency between the time of the grant reception to the time of sending the PUSCH transmission may be variable due to the LBT process performed at the UE. As part of the dynamic grant the eNB orders the UE as to which set of Physical Resource Blocks (PRBs), the MCS, and HARQ process ID to employ for its transmission. Upon completion of the uplink LBT process and post contention backoff, the UE transmits reservation signal followed by PUSCH on its scheduled resources.

Scheduled Access Scheme 1: Synchronous UL-HARQ Transmission

If due to the LBT procedure (consisting of initial CCA and subsequent defer time+ECCA), the UL subframe is unavailable, the UE skips transmitting PUSCH on the scheduled subframe. If PUSCH is not received correctly, the eNB infers from the absence of PUSCH on the scheduled transmission time interval (TTI) that either the PUSCH was not transmitted as a result of the uplink LBT process or the PUSCH was not received as a result of bad channel conditions.

In one example, the eNB schedules subsequent retransmissions either non-adaptively (via signaling Physical Hybrid-ARQ Indicator Channel (PHICH) or adaptively (via sending downlink control information (DCI) 0/3 with a new data indicator (NDI) not toggled and IMCS=29/30/31).

The advantage to this scheme is that it retains UL transmission according to the existing LTE standard. The disadvantage is that it involves re-assembly at a higher layer and may incur greater delay since HARQ transmissions can be received out of order due to both contention related delays and poor channel conditions.

Scheduled Access Scheme II: Asynchronous HARQ Transmission

The assumption of synchronous HARQ transmission may be dropped, allowing for the possibility that there is no implicit linkage between the subframe number of the scheduling DCI and the subframe number on which PUSCH is transmitted. In case the UE does not receive one or more scheduling Physical Downlink Control Channel (PDCCH), there may be a potential ambiguity regarding the HARQ process identifier (ID) and redundancy version (RV) for the PUSCH transmission. To resolve any such ambiguity, the UE may explicitly signal the HARQ process ID and the RV via the Reservation Signal.

In one example, the scheduling UL-DCI contains new fields for communicating the HARQ process ID and RV number. This allows the HARQ process ID and RV information to be conveyed to the eNB when there is no Reservation Signal being used. In another example, the UE transmits the HARQ process ID and RV number via the Reservation Signal prior to the PUSCH transmission.

Figure 7:
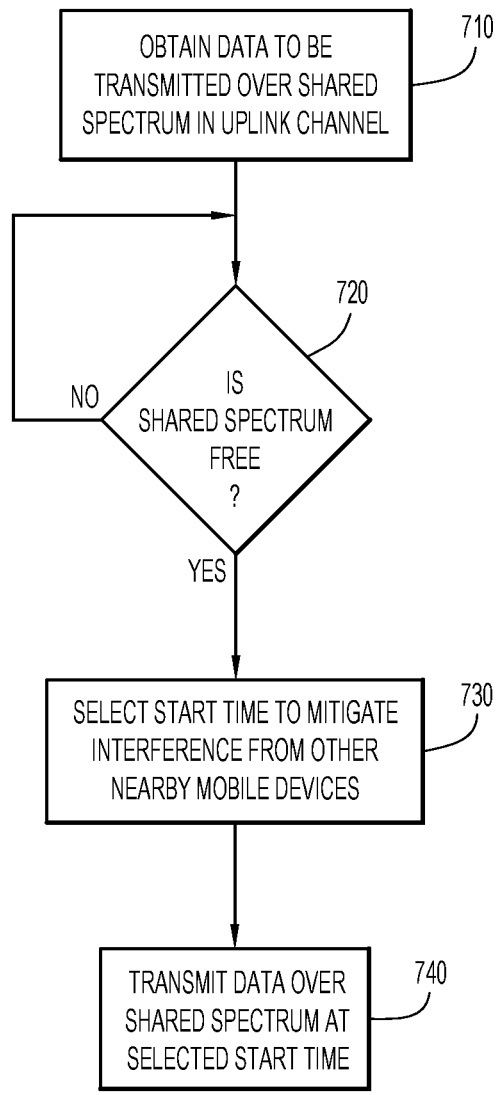
FIG. 7 is a flow chart illustrating the operations performed by a mobile device in the LAA-LTE uplink system, according to an example embodiment.

Referring now to FIG. 7, a flowchart illustrates operations in a process 700 performed by a UE (e.g., wireless node 120) in transmitting data on an uplink channel to its associated eNB. In step 710, the UE obtains data to be transmitted over the shared spectrum/medium in an uplink channel. In one example, the uplink channel comprised a plurality of frames and subframes with a predetermined timing, e.g., according to an LTE-LAA format. The UE determines when the shared spectrum is free in step 720. In one example, in order to determine when the shared spectrum is free, the UE performs a LBT process with a clear channel assessment and may include a contention backoff. After the UE determines that the shared spectrum is free, the UE selects a start time in step 730. The selected start time mitigates interference from other wireless devices in proximity to the UE. In step 740, the UE transmits data over the shared spectrum in the uplink channel to the eNB beginning at the selected start time.

Figure 8:
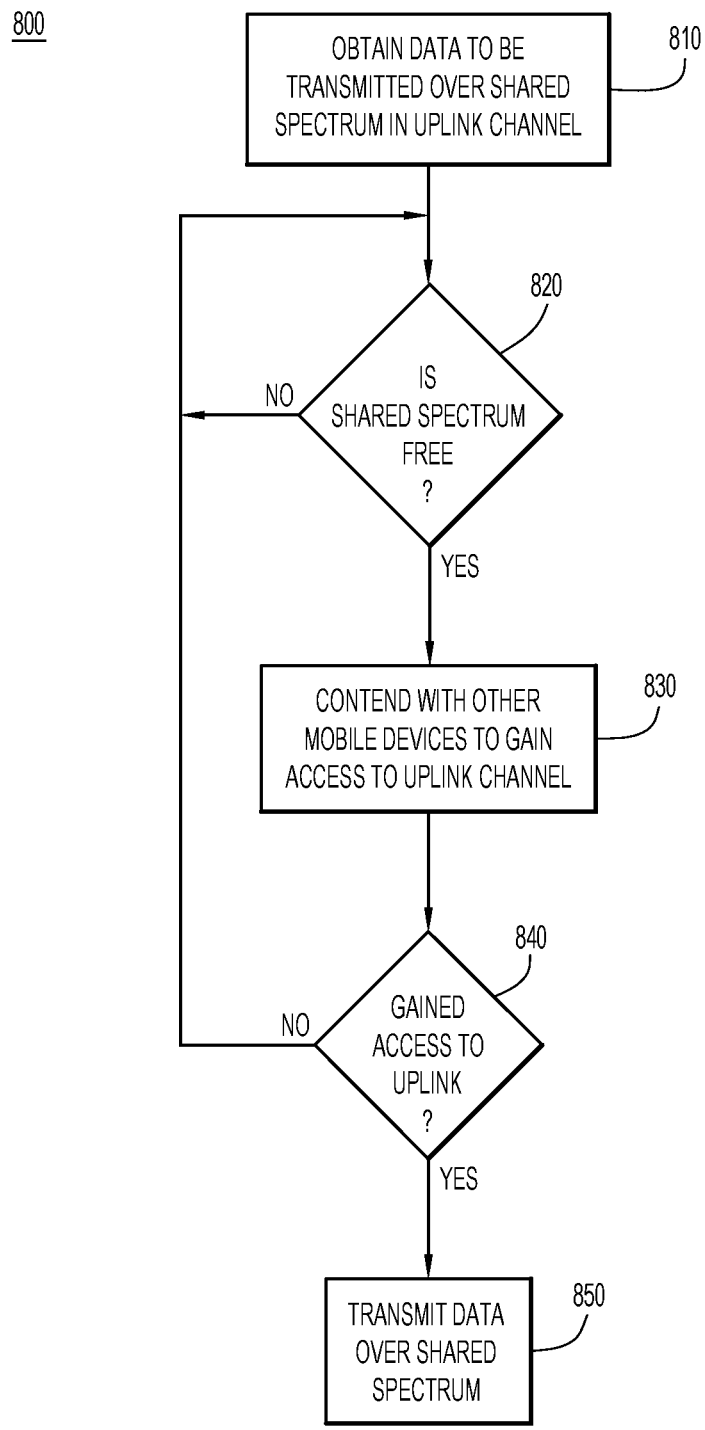
FIG. 8 is a flow chart illustrating the operations performed by a mobile device to contend for access with other mobile devices in the LAA-LTE uplink system, according to an example embodiment.

Referring now to FIG. 8, a flowchart illustrates operations in a process 800 performed by a UE (e.g., wireless node 120) in contending for access to an uplink channel to its associated eNB on a shared channel. In step 810, the UE obtains data to be transmitted over the shared spectrum/medium in an uplink channel. In one example, the uplink channel comprised a plurality of frames and subframes with a predetermined timing, e.g., according to an LTE-LAA format. The UE determines when the shared spectrum is free in step 820. In one example, the UE performs a LBT process in order to determine when the shared spectrum is free. In step 830, the UE contends with other UEs to gain access to the uplink channel. In one example, the UEs may contend for access to the uplink channel through a random backoff period, with the UE with the shortest, randomly determined, backoff period gaining access to the uplink channel. Once the UE gains access to the shared spectrum, as determined in step 840, the UE transmits the data over the shared spectrum in the uplink channel to the eNB in step 850.

Figure 9:
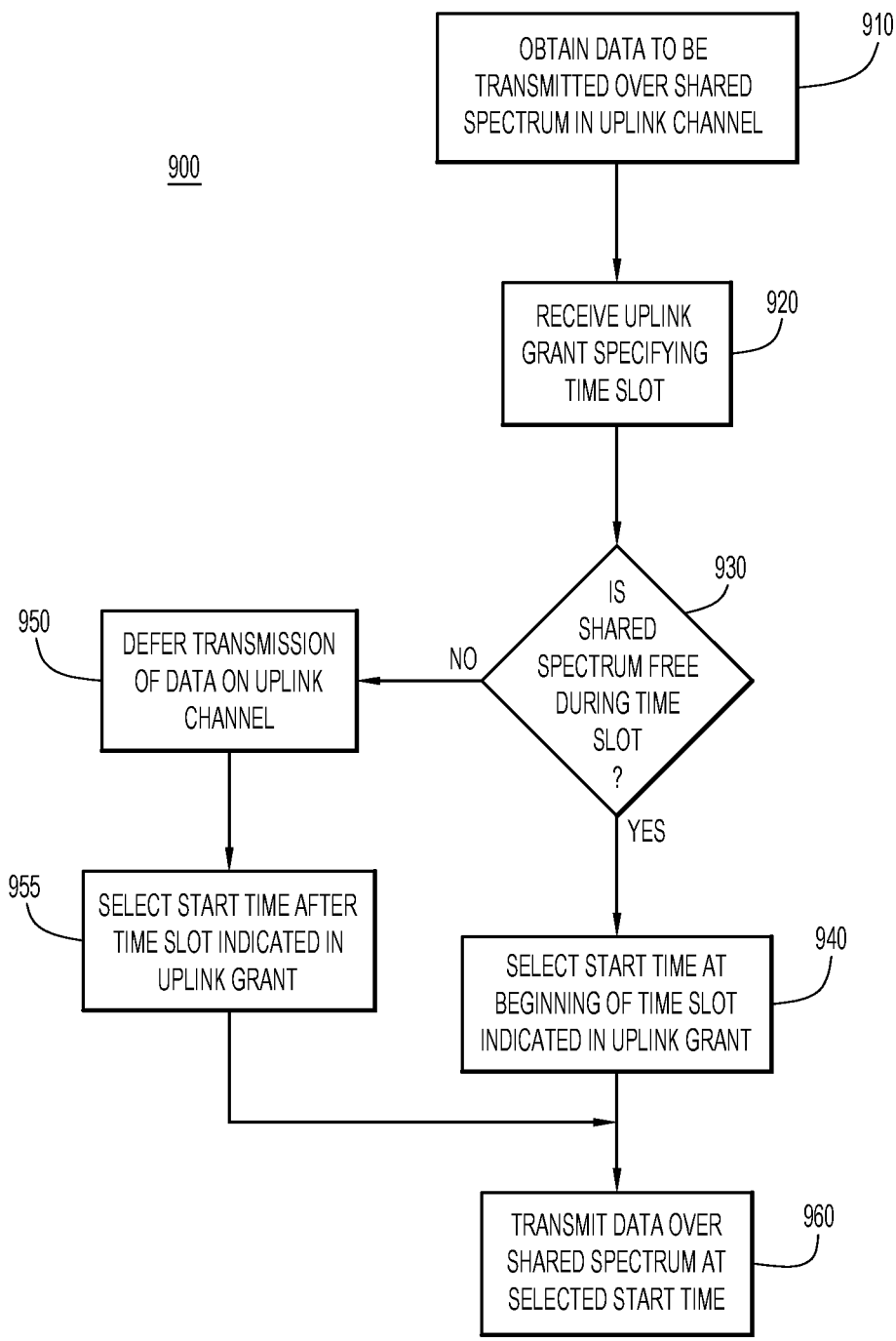
FIG. 9 is a flow chart illustrating the operations performed by a mobile device in an LAA-LTE uplink system with scheduled uplink access, according to an example embodiment.

Referring now to FIG. 9, a flowchart illustrates operations in a process 900 performed by a UE (e.g., wireless node 120) in accessing an uplink channel to its associated eNB on a shared channel according to a scheduled access scheme. In step 910, the UE obtains data to be transmitted over the shared spectrum/medium in an uplink channel. In one example, the uplink channel comprised a plurality of frames and subframes with a predetermined timing, e.g., according to an LTE-LAA format. In step 920, the UE receives an uplink grant specifying a time slot to transmit the data back to the eNB. In one example, control signals between the UE and the eNB may inform the eNB that the UE has data to transmit, which causes the eNB to transmit the uplink grant to the UE.

In step 930, the UE determines if the shared spectrum is free during the time slot specified in the uplink grant. In one example, the UE performs a LBT process in order to determine when the shared spectrum is free. If the shared spectrum is free, then the UE selects a start time at the beginning of the time slot indicated in the uplink grant at step 940. If the shared spectrum is not free, then the UE defers transmission of the data on the uplink channel at step 950, and selects a start time after the time slot indicated in the uplink grant at step 955. In one example, the UE will wait for a subsequent uplink grant from the eNB to select the start time. Alternatively, the UE may select the start time at a predetermined time interval after the time slot indicated in the original uplink grant. Once the UE has selected a start time, either in step 940 or step 955, the UE transmits the data over the shared spectrum in the uplink channel to the eNB in step 960.

In summary, schemes are presented herein for uplink channel access, medium reservation and uplink transmission for LTE operation in the unlicensed spectrum. Within a subframe, the UE monitors the channel and may send a reservation signal when the channel is free. The reservation signal should claim the usage of channel till the end of the subframe in its duration field. Each UE may start uplink transmission at different time instants within a subframe. Some explicit or implicit control information may be embedded in each UE's transmission to indicate the number of used symbols.

Some of these schemes ensure that LTE-LAA UEs contend for medium access in a fair manner to other devices (e.g. Wi-Fi) in unlicensed frequencies. Unlike existing solutions that typically try to reuse the scheduled uplink access principles of LTE uplink (which can be sub-optimal when LBT is considered), these schemes may use randomized, contention-based uplink channel access. The techniques presented herein would be employed by LTE access points and LTE UEs that are operating over uplink in unlicensed frequency channels (e.g. in 5 GHz).

Moreover, hidden nodes are removed since any Wi-Fi nodes that receive the reservation signal should stop a transmission. Exposed nodes are removed since any Wi-Fi node that does not receive CTS should be allowed to transmit. LTE-to-Wi-Fi interference is minimized when Wi-Fi nodes detect the channel is busy (i.e., used by LTE UEs).

In one form, a method is provided for a mobile device to transmit data over a shared spectrum in an uplink channel to a base station. The mobile device obtains data to be wirelessly transmitted over a shared spectrum in an uplink channel to a base station. The uplink channel comprises a plurality of frames and subframes with a predetermined timing. The method further comprises determining whether the shared spectrum is free for transmission according to a listen before transmit procedure. Responsive to a determination that the shared spectrum is free for transmission, the mobile device selects a start time in the uplink channel that mitigates interference from other mobile devices in proximity to the mobile device. Beginning at the start time, the mobile device transmits the data over the shared spectrum in the uplink channel to the base station.

In another form, a method is provided for a mobile device to transmit data over a shared spectrum in an uplink channel to a base station in a contention-based access scheme. The mobile device obtains data to be wirelessly transmitted over the shared spectrum in the uplink channel to the base station. The uplink channel comprises a plurality of frames and subframes with a predetermined timing. The method further comprises determining whether the shared spectrum is free for transmission according to a listen before transmit procedure. Responsive to a determination that the shared spectrum is free for transmission, the mobile device contends with other mobile device to gain access to the uplink channel. After gaining access to the uplink channel, the mobile device transmits the data over the shared spectrum in the uplink channel to the base station.

In yet another form, an apparatus is provided comprising a transmitter, a receiver, a modem, and a processor. The transmitter is configured to transmit wireless transmissions over a shared spectrum. The receiver is configured to receive wireless signals in the shared spectrum. The modem is configured to modulate signals to be transmitted and demodulate received signals. The processor is configured to obtain data to the wirelessly transmitted over the shared spectrum in an uplink channel to a base station. The uplink channel comprises a plurality of frames and subframes with a predetermined timing. The processor is also configured to determine whether the shared spectrum is free for transmission according to a listen before transmit procedure. Responsive to a determination that the shared spectrum is free for transmission, the processor is configured to contend with mobile devices in proximity to the apparatus to gain access to the uplink channel. After gaining access tot eh uplink channel the processor is further configured to cause the transmitter to transmit the data over the shared spectrum in the uplink channel to the base station.

In a further form, an apparatus comprising a network interface and a processor is configured to perform any of the methods described and shown herein.

In still another form, a non-transitory computer readable storage media is provided that is encoded with instructions that, when executed by a processor, cause the processor to perform any of the methods described and shown herein.

The above description is intended by way of example only. In particular, the techniques described herein have been described with respect to LTE-LAA and Wi-Fi formats, but may also be used with other any wireless format that may use a shared spectrum of frequencies.

What is claimed is:

1. A method comprising:
   at a mobile device, obtaining data to be wirelessly transmitted over a shared spectrum in an uplink channel to a base station, the uplink channel comprising a plurality of frames and subframes with a predetermined timing;
   obtaining an indication of predetermined subframes within the uplink channel for the mobile device to transmit to the base station;
   determining whether the shared spectrum is free for transmission according to a listen before transmit procedure;
   responsive to a determination that the shared spectrum is free for transmission during the predetermined subframes, contending with other mobile devices to gain access to transmit in the predetermined subframes of the uplink channel; and
   after gaining access to the uplink channel, transmitting the data over the shared spectrum in the predetermined subframes of the uplink channel to the base station.

2. The method of claim 1, wherein contending with the other mobile devices comprises determining whether the shared spectrum is free for a randomly determined contention time period, and wherein the mobile device gains access to the uplink channel if the shared spectrum is free for the randomly determined contention time period.

3. The method of claim 1, wherein contending with the other mobile devices comprises determining whether the mobile device will transmit the data in the shared spectrum based on an access probability parameter that is updated at regular intervals according to measured statistics.

4. The method of claim 3, wherein the measured statistics comprise one or more of Hybrid Automatic Repeat Request (HARQ) statistics or a number of the other mobile devices with data to transmit.

5. The method of claim 1, further comprising transmitting a reservation signal over the shared spectrum prior to transmitting the data over the shared spectrum, the reservation signal causing the other mobile devices to refrain from transmitting in the shared spectrum for a predetermined amount of time.

6. The method of claim 5, wherein the reservation signal includes signals formatted according to a different radio access technology than that used for transmissions in the uplink channel.

7. The method of claim 1, wherein the mobile device gains access to the uplink channel without receiving an uplink grant from the base station.

8. An apparatus comprising:
a transmitter configured to transmit wireless transmissions over a shared spectrum;
a receiver configured to receive wireless signals in the shared spectrum;
a modem configured to modulate signals to be transmitted and demodulate received signals; and
a processor configured to:
obtain data to be wirelessly transmitted over the shared spectrum in an uplink channel to a base station, the uplink channel comprising a plurality of frames and subframes with a predetermined timing;
obtain, via the receiver, an indication of predetermined subframes within the uplink channel for the transmitter to transmit to the base station;
determine whether the shared spectrum is free for transmission according to a listen before transmit procedure;
responsive to a determination that the shared spectrum is free for transmission during the predetermined subframes, contend with mobile devices in proximity to the apparatus to gain access to transmit in the predetermined subframes of the uplink channel; and
after gaining access to the uplink channel, cause the transmitter to transmit the data over the shared spectrum in the predetermined subframes of the uplink channel to the base station.

9. The apparatus of claim 8, wherein the processor is configured to cause the apparatus to contend with the mobile devices by determining whether the shared spectrum is free for a randomly determined contention time period, and wherein the apparatus gains access to the uplink channel if the shared spectrum is free for the randomly determined contention time period.

10. The apparatus of claim 8, wherein the processor is configured to cause the apparatus to contend with the mobile devices by determining whether the apparatus will transmit the data in the shared spectrum based on an access probability parameter that is updated at regular intervals according to measured statistics.

11. The apparatus of claim 10, wherein the measured statistics comprise one or more of Hybrid Automatic Repeat Request (HARQ) statistics or a number of the mobile devices with data to transmit.

12. The apparatus of claim 8, wherein the processor is further configured to cause the transmitter to transmit a reservation signal over the shared spectrum prior to transmitting the data over the shared spectrum, the reservation signal causing the mobile devices to refrain from transmitting in the shared spectrum for a predetermined amount of time.

13. The apparatus of claim 12, wherein the transmitter is configured to transmit the reservation signal with signals formatted according to a different radio access technology than that used for transmissions in the uplink channel.

14. The apparatus of claim 8, wherein the processor is configured to gain access to the uplink channel without receiving an uplink grant from the base station.

15. One or more non-transitory computer readable storage media encoded with software comprising computer executable instructions and, when the software is executed by a processor on a mobile device, operable to cause the processor to:
obtain data to be wirelessly transmitted over a shared spectrum in an uplink channel to a base station, the uplink channel comprising a plurality of frames and subframes with a predetermined timing;
obtain an indication of predetermined subframes within the uplink channel for the mobile device to transmit to the base station;
determine whether the shared spectrum is free for transmission according to a listen before transmit procedure;
responsive to a determination that the shared spectrum is free for transmission during the predetermined subframes, contend with other mobile devices to gain access to transmit in the predetermined subframes of the uplink channel; and
after gaining access to the uplink channel, transmit the data over the shared spectrum in the predetermined subframes of the uplink channel to the base station.

16. The non-transitory computer readable storage media of claim 15, further comprising instructions operable to cause the processor to contend with the other mobile devices by determining whether the shared spectrum is free for a randomly determined contention time period, and wherein the mobile device gains access to the uplink channel if the shared spectrum is free for the randomly determined contention time period.

17. The non-transitory computer readable storage media of claim 15, further comprising instructions operable to cause the processor to contend with the other mobile devices by determining whether the mobile device will transmit the data in the shared spectrum based on an access probability parameter that is updated at regular intervals according to measured statistics.

18. The non-transitory computer readable storage media of claim 17, wherein the measured statistics comprise one or more of Hybrid Automatic Repeat Request (HARQ) statistics or a number of the other mobile devices with data to transmit.

19. The non-transitory computer readable storage media of claim 15, further comprising instructions operable to cause the processor to transmit a reservation signal over the shared spectrum prior to transmitting the data over the shared spectrum, the reservation signal causing the other mobile devices to refrain from transmitting in the shared spectrum for a predetermined amount of time.

20. The non-transitory computer readable storage media of claim 19, further comprising instructions operable to cause the processor to transmit the reservation signal with signals formatted according to a different radio access technology than that used for transmissions in the uplink channel.

* * * * *